July 1, 1958  C. F. TALBOT  2,841,693
TAPERED HOUSING AND SLEEVE FOR FLASHLIGHTS
Filed July 9, 1954

CHARLIE F. TALBOT
*INVENTOR.*

BY *Jacks W. Hayden*

ATTORNEY

United States Patent Office 2,841,693
Patented July 1, 1958

2,841,693

TAPERED HOUSING AND SLEEVE FOR FLASHLIGHTS

Charlie F. Talbot, Houston, Tex.

Application July 9, 1954, Serial No. 442,249

2 Claims. (Cl. 240—10.66)

The present invention relates to a flashlight housing and a battery holder and more particularly to a tapered housing and battery holder whereby batteries may be easily removed from the flashlight with a minimum of effort.

In flashlight constructions presently used it is not uncommon for the batteries to become stuck in the housing after an extended period of time. Quite frequently such sticking is so severe that it is impossible to remove the batteries without damage to the flashlight and this necessitates throwing away of the entire flashlight which is expensive and a waste of materials.

The present invention has for its object a flashlight which is provided with a battery holder constructed and arranged to hold the batteries in the flashlight and which may be removed along with the batteries as a unit when it is necessary to replace the batteries.

A still further object of the invention is to provide a flashlight battery holder which is tapered so that one end thereof is of a smaller diameter than the other end to eliminate sticking of the holder in the flashlight whereby the holder and batteries may be easily removed from the flashlight.

Still another object of the invention is to provide a liner for a flashlight that is adapted to hold storage batteries in place in the flashlight and which may be easily removed from the flashlight when the batteries are worn out so that the batteries may be replaced and the liner reinserted in the flashlight.

Other objects and advantages will become more readily apparent from a consideration of the following description and drawings wherein.

Figure 1:
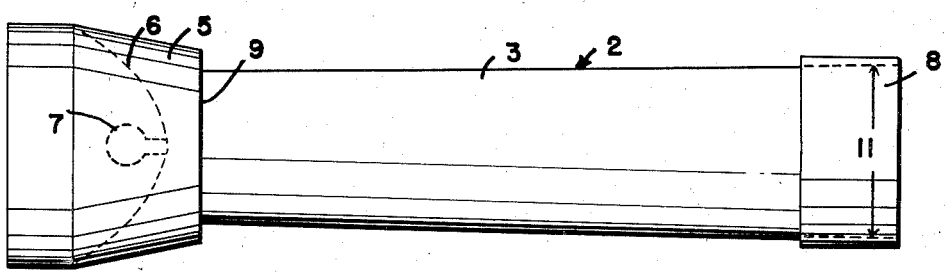
Fig. 1 is a side elevation illustrating a flashlight having a tapered housing or body in accordance with the present invention and with an enlarged head at the front end and a closure cap at the rear end of the housing.

A flashlight is illustrated generally at 2 in Fig. 1 of the drawings and is shown as including an elongated tubular housing 3 which is provided with an enlarged head 5 to accommodate a reflector 6 and light bulb 7 therein. The reflector 6 and light bulb 7 may be of any well known type and it is believed unnecessary to give a detailed description of either the reflector or bulb and the manner in which they are positioned in the head 5 of the flashlight.

The rear end of the elongated housing 3 is adapted to be closed off by the closure cap 8 which may be engaged with such housing by any suitable means such as threads or the like.

Attention is directed to the particular configuration of the elongated tubular housing 3 in that its diameter is somewhat smaller at the forward end 9 thereof and it gradually increases in diameter toward the rear end so that the rear end has a larger diameter than the front end as illustrated at 11.

Figure 2:
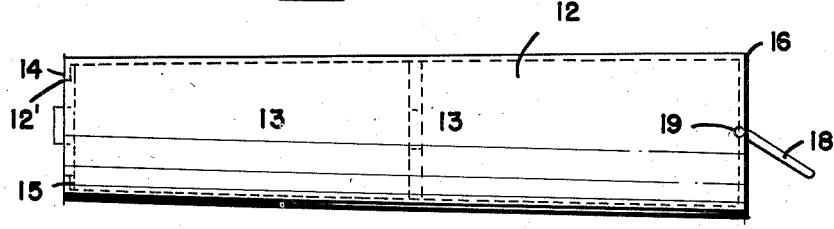
Fig. 2 is a side elevation of a liner or sleeve which is tapered in accordance with the present invention to facilitate removal of such liner from the flashlight housing.
Figure 3:
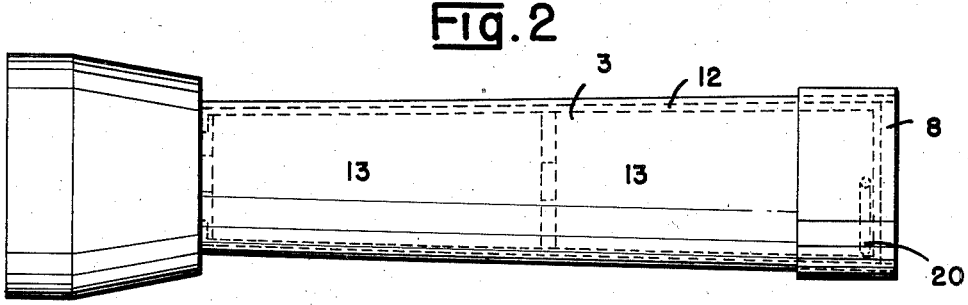
Fig. 3 is a side elevation of a flashlight showing the tapered housing with the tapered liner or sleeve positioned therein.

A battery holder 12 is shown in Fig. 2 which holder is a sleeve or liner adapted to receive and support batteries 13 therein. To aid in positioning and maintaining the batteries 13 in the sleeve 12, a projection 14 extends inwardly from the inner end 12' of the sleeve 12 and is adapted to abut the batteries 13 as illustrated at 15.

It is to be noted that the sleeve 12 is of a tapered configuration so that it may conformably fit within the housing 3 and as shown in Fig. 2, the inner end 12' is of a smaller diameter than outer end 16. A bail 18 is pivotally engaged at 19 in the outer end 16 of sleeve 12 and provides a means whereby such sleeve may be easily removed from the housing 3.

As shown in Fig. 2 of the drawings, the sleeve 12 is adapted to telescope into the elongated housing 3 and to conformably fit therewith. The sleeve 12 forms a support for the batteries 13 and positions them within the housing 3 so as to provide a source of energy for the light bulb 7. After the batteries have been positioned in the holder 12, and the holder 12 fitted in tapered housing 3, the closure 8 may be threadedly engaged on the end of the housing and the flashlight is now ready for use. It is to be noted that the bail 18 is adapted to be moved to an inoperative position as illustrated at 20 when the closure cap is engaged on the housing 3.

Quite frequently batteries become stuck in flashlights, particularly when the batteries are left in the flashlight housing over an extended period of time. It is not uncommon for such sticking to become so pronounced as to render the flashlight useless, since it is impossible to remove the batteries without damaging the flashlight housing 3.

Figure 4:
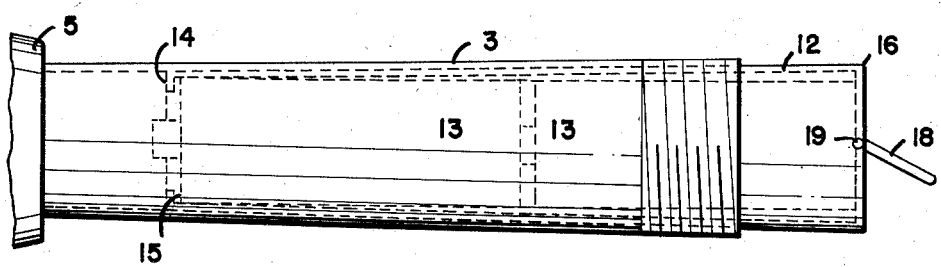
Fig. 4 is a partial side elevation with the rear end closure cap removed and showing the tapered holder partially removed from the tapered flashlight housing.

Fig. 4 of the drawings illustrates the manner in which the present flashlight construction eliminates the sticking of the batteries within the flashlight housing 3. The closure cap 8 is shown as removed in such drawings and the bail 18 has been engaged and by exerting a pull on the sleeve 12 it may quickly and easily be removed from its position within the housing 3. Since the batteries are positioned in such sleeve and since the projection 14 engages against the batteries as illustrated at 15 to prevent their slipping out the inner end of such sleeve, the batteries as well as the sleeve 12 can be removed from the battery housing 3 as a unit.

The liner may be made of any suitable material such as plastic, paper or light metal and if the batteries have become stuck therein, such unit may be thrown away and replaced by a similar unit. If, however, the batteries are not stuck in the liner, they may be removed and new ones inserted in the liner whereupon the liner and batteries may then be inserted in the flashlight.

The liner 12 and more particularly the tapered arrangement thereof provides a construction which may be easily removed from a battery housing. The tapered construction inhibits sticking of the sleeve 12 within the housing 3 and facilitates removal of the sleeve and the batteries from the housing.

Broadly the invention relates to a tapered battery housing and a tapered sleeve adapted to telescopically fit within such housing whereby batteries supported within the sleeve may be quickly and easily removed from the battery holder.

What is claimed is:

1. In a flashlight, an elongated hollow housing, a battery holder telescoped into said housing, said holder including a sleeve, said sleeve being tapered from a larger diameter at its rear end to a smaller diameter at its front end, an inwardly extending projection on the front end of said sleeve for engaging and supporting a battery, a closure cap for engaging with said housing at the rear end thereof, and a bail means pivotally secured to the rear end of said sleeve whereby it may be moved to inactive position so that said closure cap may enclose it when said cap is engaged with said housing, said bail means movable to active position when said cap is removed so that said sleeve and batteries therein may be removed from said housing.

2. A flashlight constructed and arranged so that the batteries may be easily and quickly removed from the flashlight including an elongated hollow housing, said housing being tapered from a larger diameter at its rear end to a smaller diameter at its front end, a tapered sleeve battery holder telescoped into said housing and conformably fitting therewith, an inwardly extending projection on the inner end of said sleeve for abutment with a battery supported by said sleeve, a closure cap for engaging with said housing at the rear end thereof, a reflector head at the other end of said housing, a bail pivotally secured to the rear end of said sleeve and movable to inactive position when said closure cap is secured on said housing, but adapted for engagement when said closure cap is removed whereby said sleeve and a battery supported therein may be withdrawn from said hollow housing.

References Cited in the file of this patent
UNITED STATES PATENTS

| | | |
|---|---|---|
| 1,067,646 | Downey | July 15, 1913 |
| 1,254,042 | Howe | Jan. 22, 1918 |
| 2,062,113 | Baer et al. | Nov. 24, 1936 |
| 2,221,126 | Barbee | Nov. 12, 1940 |

FOREIGN PATENTS

| | | |
|---|---|---|
| 59,571 | Netherlands | June 16, 1947 |